April 1, 1941.                    E. S. BUSH                    2,236,746
                   ELECTRICAL SPEED-CHANGE CONTROL APPARATUS
                   Filed May 26, 1938            5 Sheets-Sheet 1

INVENTOR
EUGENE S. BUSH
BY Robert B. Terry
ATTORNEY

April 1, 1941.    E. S. BUSH    2,236,746
ELECTRICAL SPEED-CHANGE CONTROL APPARATUS
Filed May 26, 1938    5 Sheets-Sheet 4

INVENTOR
EUGENE S. BUSH
BY Robert B. Terry
ATTORNEY

Patented Apr. 1, 1941

2,236,746

UNITED STATES PATENT OFFICE 2,236,746

ELECTRICAL SPEED-CHANGE CONTROL APPARATUS

Eugene S. Bush, Overland, Mo.

Application May 26, 1938, Serial No. 210,289

23 Claims. (Cl. 74—334)

This invention relates to electrical speed-change control apparatus, and more particularly to speed-change mechanism of electromagnetic type, which is selectively manually or automatically controlled and adapted for operative association with a multi-speed power transmission assembly such as employed in automotive vehicles.

A general object of the invention, broadly stated, is an improved electromagnetic device for general application to the control of associated apparatus requiring a compound control movement, or particularly, a control movement in different planes.

Yet another object, akin to the foregoing, is attained in an electromagnetic device capable of producing, selectively, rotatory movements and axial movements, and hence adapted to effect, for example, either a to-and-fro, or a side-to-side type of movement, if desired, of a common control member of adjunctive devices to be controlled. The ensuing objects, are, for better understanding, expressed with respect to the control of an automotive speed-change transmission, but are to be understood as applicable in most instances, to the utilization of the invention for other control purposes.

An object of the invention is to provide a compact, yet efficient and positively-acting speed-change mechanism for automotive transmission assemblies and the like, the mechanism being of electromagnetic type and operated selectively by manual control means conveniently arranged for operator accessibility, or by automatically functioning control means, as a speed-responsive device influenced by automotive vehicle speeds.

Another object is attained in the provision of an electromagnetic gear-shifter or speed-change device for automotive vehicles, which is adapted for ready and easy application to transmission assemblies of the general type utilized in existing types of such vehicles, and further which is formed as a compact unit requiring but a minimum of space for mounting in operative association with the transmission assembly.

A further object resides in the provision of a speed-change control device for the purpose noted, adapted for operative connection, for example, to the gear-shift member of an automotive transmission assembly; control means therefor including a manually actuated control element arranged for easy operator-accessibility; additional control means for the device, functioning automatically in response to vehicle speed, and means for rendering operative either control means to the exclusion of the other.

Yet another object is to provide a gear-shift device and selective control means therefor, comprised of relatively few parts related in a compact manner, the device being of electromagnetic type and including relatively movable armature members which cooperate in effecting the gear shifting function of the device.

Yet a further object is to provide in a device of the type described, an electromagnetic field assembly, and cooperating armature assemblies adapted for axial displacement as a unit, in response to energization of the field assembly, the armatures being operatively related such that one thereof is adapted for rotary movement relative to the other, in response to energization of the armature windings on the latter armature, the axial displacement of the armatures as a unit and the rotary movement of one relative to the other being utilized in effecting the gear-shifting function of the device in a manner to simulate the shifting motion of a prevalent type of standard gear shift assembly.

Further objects and advantages will readily appear as the description proceeds, and from the accompanying drawings, in which.

Figure 1:
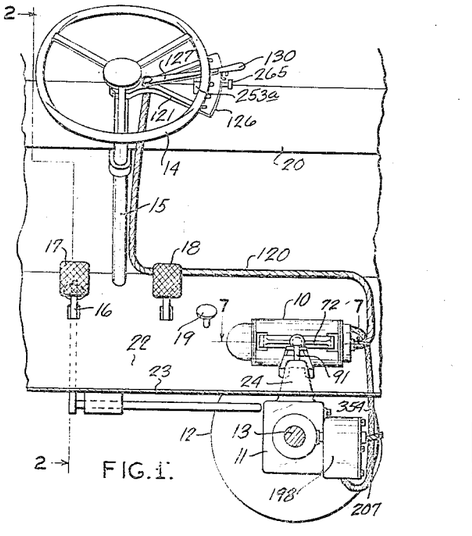
Fig. 1 is a fragmentary elevation of the instrument board and foot board zone of an automotive vehicle, in which are located the steering and control apparatus therefor, the view illustrating the speed change or gear-shifting device forming the subject of the invention, as positioned on the foot board and in operative association with the gear-shifting lever of the transmission assembly.
Figure 2:
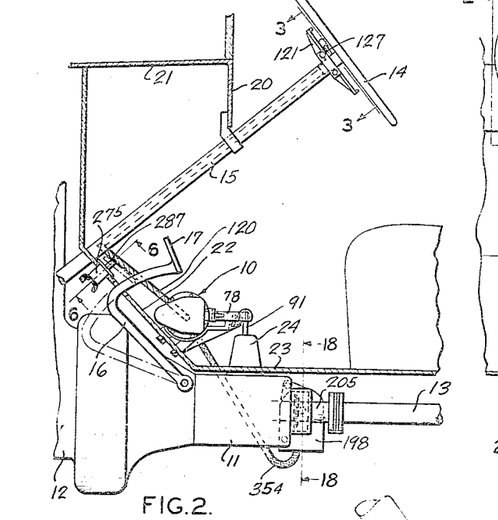
Fig. 2 is a partly sectional side elevation of the assembly shown by Fig. 1, as viewed from line 2—2 in Fig. 1.

Referring now to the drawings by suitable characters of reference, the electromagnetic gear-shifting device indicated generally at 10 (Figs. 1 and 2), which in association with control mechanism therefor, constitutes the subject of the present invention, is shown as applied to a multi-speed power transmission assembly 11 of a type adapted for application to automotive vehicles and the like. In the present example and for illustrative purposes only, a portion of an automotive vehicle is shown in Figs. 1 and 2, as the fly-wheel end of the vehicle driving unit or engine 12, to which is coupled the transmission assembly 11; vehicle drive shaft 13; steering wheel 14 and its shaft column 15; clutch lever 16 and its foot pedal 17; brake pedal 18 and foot accelerator 19. Also shown in fragmentary part, is instrument board 20, cowl 21, foot board 22 and the floor board structure 23. The clutch lever, as well as the brake lever and foot accelerator, extend upwardly through a suitable aperture in foot board 22, to provide for ready operator-accessibility thereto, while the housing 24 for the transmission gear shift lever, modified as is hereinafter described, extends upwardly through the floor board 23.

Although the invention is at times designated by purpose as a gear shifting device, or shifter, it is to be understood as applicable, in a broad sense, to other special control purposes, whether or not associated with a gear-type transmission, or with a transmission involving shiftable gears or the like, or one of constant-mesh type.

Turning now to the electromagnetic control operator device 10, shown in detail in Figs. 7 through 13, the device comprises a supporting frame 26 (Fig. 10) of a suitable material, as cast iron, formed to provide an arcuate seat or saddle portion 27 for the reception of a cylindrical member or case 28, secured thereto as by the screws 29. Frame 26 is mounted on foot board 22 adjacent the shift lever housing 24 (Figs. 1, 2 and 10), being secured thereto by suitable bolts or screws 30.

Figures 7, 22:
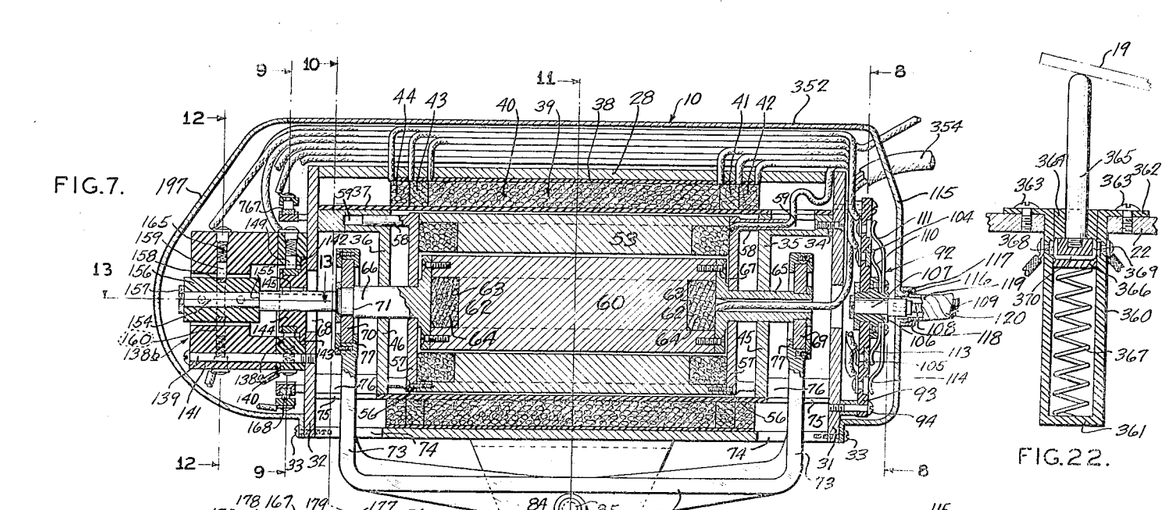
Fig. 7 is a greatly enlarged, longitudinal section of the gear-shifter device, shown in operative association with the gear-shift member of the transmission, the view being taken along line 7—7 in Fig. 1.
Fig. 22 illustrates, principally in section, a preferred form of circuit-closing switch adapted for actuation by the accelerator pedal of the vehicle.

Cylinder 28 is formed by preference, of a suitable nonmagnetic metal or other material, and has its ends closed by end plates or discs 31 and 32 which may be of the same material as the cylinder, the discs being secured to the cylinder by screws 33 (Fig. 7). Disposed concentrically within the cylinder 28, and secured to the end plate 31 as by screws 34, is a cylindrical, cup-shaped element 35, the external diameter of which is somewhat less than the internal diameter of cylinder 28, for a purpose later to appear. A similar cup-shaped element 36 is supported in like manner, on the opposite end plate 32, both of these elements, by preference, being formed of a non-magnetic metal, although they may be of other suitable material. A relatively thin-walled cylinder 37 formed of insulating material and substantially coextensive in length with the cylinder 28, is disposed therein with its ends sleeved upon the elements 35 and 36 (Fig. 7). Supported in part by the cylinder 37 and occupying the space between the cylinder and an insulating lining 38 sleeved within the outer cylinder 28, is a winding structure 39 comprised of a central, relatively long coil section 40, a pair of relatively short coil sections 41 and 42 arranged closely adjacent that end of the central coil nearest the end plate 31, and a similar pair of coil sections 43 and 44 closely adjacent the opposite end of coil 40. The winding structure 39, while of an overall length less than that of the cylinder 28, is of such longitudinal extent as to exceed slightly, the longitudinal distance between the wall portions 45 and 46 of elements 35 and 36 respectively, this for a purpose later more fully appearing. The coil sections are electrically connected in series as will later appear, the connections between coils 40—41, 41—42, 40—43 and 43—44 being tapped respectively by leads 47, 48, 49 and 50, while the end turns of coils 42 and 44 are connected respectively, to leads 51 and 52. The circuit connections of the several electrical leads and conductors will be described later in connection with the wiring diagram of Fig. 21. However, it is to be noted here that the winding 39 comprises the energizing agency for the electromagnetic elements of the device, now to be described.

Figures 11, 12, 13:
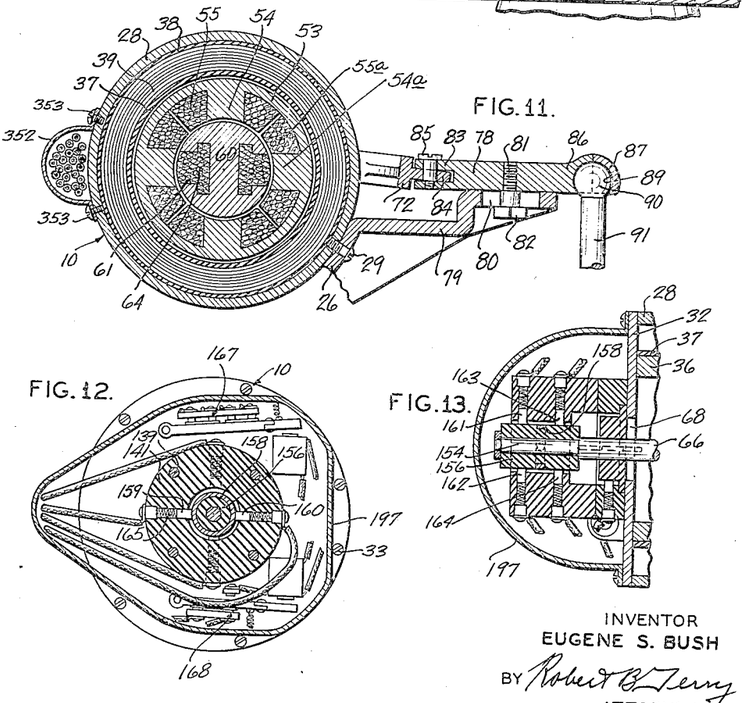
Figs. 11 and 12 are further transverse sections of the device, as taken respectively, along lines 11—11 and 12—12 of Fig. 7.
Fig. 13 is a longitudinal section of one end portion of the device, illustrating certain switch controls therefor, the view being taken along line 13—13 in Fig. 7.

Disposed within insulating cylinder 37 and between the walls 45 and 46 of elements 35 and 36, is an armature core 53 of annular form comprised of suitable magnetic material and provided with two pairs of diametrally opposed salient poles or polar projections 54 and 54a directed internally thereof, which are angularly displaced by 90 degrees (Fig. 11).

The winding arrangement associated with the opposed, paired salient polar projections has been selected for present description because of greater ease of reference and understanding; however it will appear from later description that a distributed type of winding may be utilized in a circuit arrangement readily adaptable by those skilled in the electrical arts.

In the example disclosed, the longitudinal extent of the poles is less than that of the core, to provide end space for armature windings 55 secured about poles 54, and windings 55a about the poles 54a. Secured to each end of the core as by screws 56, is a disc 57 provided with a plurality of longitudinally projecting pins 58 which slidably seat in apertures 59 provided therefor in the peripheral portion of the adjacent elements 35 and 36. These pins engaging in the slots 59, serve operatively to support the armature assembly, and further serve to prevent rotative movement of the assembly. As shown by Fig. 7, the longitudinal extent of the core assembly is less than the distance between the walls 45 and 46 of elements 35 and 36, the arrangement being such that through the pin and slot provision, the core assembly may be displaced longitudinally in either direction, such movement being limited only by abutment of a core disc with the wall 45 or 46 of the adjacent element 35 or 36. The longitudinal movement of the core assembly is utilized in a manner later appearing, for effecting, in cooperation with other operative elements, speed-change shifting of the transmission gearing.

Located concentrically within the above described armature core and substantially axially coextensive therewith, is a second or inner armature core element 60 formed of magnetic material. The core is longitudinally grooved or notched as at 61, on opposite sides thereof, and the end portions 62 are also notched or cut-away, as at 63, the grooves and end notches providing space for an armature winding 64. The inner armature which appears as a two-pole element, is adapted for rotary movement relative to the outer armature core 53, being rotatively supported by a pair of flanged shaft elements 65 and 66, the shaft 65 being operatively connected through its flange, on one end of the core, as by the screws 67, and having its shaft portion extended through the end plate 57 of armature core 53, and through the wall 45 of element 35. The end plate 57 and wall 45 serve as bearing supports for the shaft, as will be observed from Fig. 7. The other shaft 66 is similarly secured to the opposite end of core 60, and extends through the opposite end plate 57 of core 53, wall 46 of element 36 and thence through an opening 68 provided therefor in the plate 32, the shaft extending outwardly beyond the latter plate for a purpose later appearing. The plate 57 and wall 46 serve as bearing supports for the shaft. It will be observed that portions of the shaft flanges abut the end plates 57 of core assembly 53, thus precluding axial displacement of core 60 relative to core 53, but providing for axial movement thereof with core 53 when the latter is moved, so that the two core assemblies are longitudinally displaceable as a unit. Moreover, through the supporting shaft elements, the inner core 60 is adapted for rotary movement relative to the outer core 53, and such movement of the inner core is employed through means now to be described, for effecting certain operations in the function of the device to shift the transmission gearing.

Figure 10:
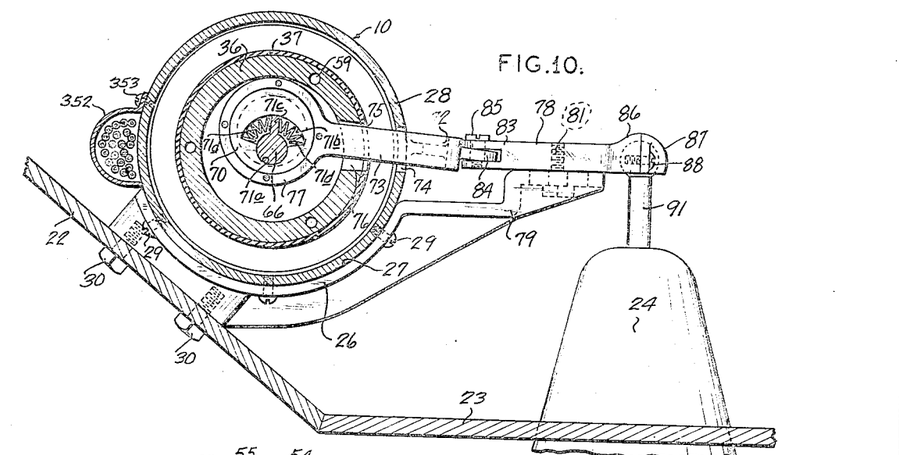
Fig. 10 is a further transverse sectional elevation of the device shown as mounted on the foot board and in operative connection to the gear-shift member of the transmission assembly, the view being taken along line 10—10 in Fig. 7.

An eccentric disc 69 is operatively secured upon the end portion of shaft 65 located within the element 35, the shaft end being shouldered to receive the disc, while a similar eccentric disc 70 is likewise secured to a shouldered portion 71 of the opposite shaft 66, the shaft portion 71 and disc 70 being located within the element 36. It is a preference in the present example operatively to connect the eccentrics to the shafts in the manner illustrated in Fig. 10 for the eccentric 70 and its shaft 66. The eccentric disc is provided with a shaft seat 71a; an arcuate slot 71c preferably formed as an integral part of the shaft, and a pair of compression springs 71d, one on each side of the finger, and being arranged between the finger and one end of the slot, (Fig. 10). Thus there is provided a somewhat resilient, lost motion drive connection between the shaft and eccentric. Since the eccentrics constitute operating elements for effecting transmission gear shifting by the device, as will later appear, the springs serve to absorb shock attending the speed-change or shifting function of the mechanism.

A U-shaped or forked member 72 is arranged externally of the case 28, with its arms 73 extended laterally through end slots 74 in case 28, slots 75 in cylinder 37 and slots 76 in elements 35 and 36, to the interior of the latter elements, in the manner shown by Figs. 7 and 10. The ends of the arms 73 are formed to provide eccentric straps 77, one of which is operatively secured to eccentric 69 while the other is similarly secured to eccentric 70. The manner of securement in each instance is such as to cause the straps to follow both the rotary movement of the eccentrics and the axial displacement thereof, the latter effected by axial displacement of the armature core assemblies 53 and 60 moving as a unit, and the former by rotary movement of core 60 alone. As a consequence of such armature core movements, the member 72 will be shifted longitudinally of the assembly, permitted by a substantial longitudinal extent of the slots through which the arms 73 pass, and also laterally of the assembly, through eccentric rotation. The resultant movement of frame or member 72 is utilized, through a suitable coupling agency, to effect the desired shifting of the transmission gearing.

The coupling agency is found in the present example, in an arm or lever 78 seated upon a lateral extension 79 of frame 26 (Figs. 7, 10 and 11). The extension 79 is provided with a slot 80 therethrough, the major axis of which is at a right angle to the axis of the electromagnet assembly. Slidably seated in the slot and threadedly engaging the lever 78 substantially intermediate its ends, is a pivot pin 81 provided with a head 82 which engages the under side of extension 79. The headed pin serves to retain the lever in assembly on the extension, and in cooperation with the slot 80, permits both a pivotal and bodily displacement movement of the lever. One end 83 of the lever is preferably furcated for pivotal engagement with a rib or flange 84 formed on the member 72. The connection thereto is effected by a pivot pin 85 and is made at a point on the flange substantially intermediate the ends of member 72 (Fig. 7). The opposite end 86 of the lever is formed to provide, in cooperation with a cap 87 secured thereto by bolts 88, a hemispherical socket 89 for the reception of a ball type head 90 on the transmission gear-shift member 91. The member 91 is somewhat modified over the prevailing manually actuable gear-shift lever, in that it is considerably shortened so that the ball-socket connection of the electromagnetic shifter thereto is made relatively close to the lever housing 24.

The relative positions of the elements above described, as shown in Figs. 7, 10, and 11, are those which effect a "neutral" position of gear-shift lever 91 and hence of the transmission gear assembly. In this instance, the armature core assemblies 53 and 60 (which are longitudinally movable as a unit) are longitudinally centralized with respect to the winding assembly 39 and to the elements 35 and 36 (Fig. 7), while the poles of inner core 60 are in magnetic register with the opposed poles 55 of the outer armature (Fig. 11), the position of the inner core of course, determining the positions of the eccentrics 69 and 70 which is the "neutral" condition of the mechanism, are disposed as indicated for the eccentric 70 in Fig. 10. In the shifting operation of the device as will hereinafter more fully appear, longitudinal displacement of the armature cores as a unit, say to the right in Fig. 7, will effect through the described gear-lever connecting structure, movement of the gear-lever 91 to one extreme of its "neutral" travel (to the left in Fig. 7). Following this, a rotary movement of inner core 60, will effect through the eccentrics, actual gear-shifting movement of lever 91; rotation of the core in one direction producing a gear-shift for "reverse" drive, and in the other direction producing a gear shift for "first speed" drive. In like manner, longitudinal displacement of the cores as a unit, in the opposite direction, as to the left in Fig. 7, and thence rotation of the inner core 60 in one or the other direction of its rotary movement, will effect gear-shift actuation of lever 91 to produce "second speed," or "third speed" gear-drive conditions in the transmission assembly. The foregoing description of speed positions is given in respect to a so-called standard-shift speed-change transmission, and may of course be modified for different speed-change control requirements.

As before indicated, the electromagnetic shifter is controlled either manually or automatically, through suitable switching mechanism and selector devices. Describing now the manual control mechanism, this apparatus includes a switch assembly generally indicated at 92 (Figs. 7 and 8), which is by preference, arranged adjacent to and externally of the end plate 31. The switch comprises a contact-supporting disc 93 secured to plate 31 by screws 94 and spacer elements 95, the disc having mounted thereon paired contacts 96, 97, 98 and 99 arranged in arcuate or spread fashion near the periphery of the disc (right-hand side of Fig. 8). The adjacent pair of contacts 96 and 97 are angularly spaced to a greater extent than the others for a purpose presently appearing. Similarly arranged near the diametrally opposite peripheral section of the disc, are an equal number of paired contacts 100, 101, 102 and 103, the arrangement being such that paired contacts 100 are in diametral register with the pair 96 and similarly with the pairs 101—97, 102—98 and 103—99. Paired contacts 96 and 100 are indicated on the disc by the letter "R," designating these as the reverse-speed contacts, while the next adjacent pairs in register are provided with numeral indicia "1", indicating them as the first-speed contacts. The indicia "2" and "3" are applied respectively, to the succeeding paired contacts, indicating second- and third-speed contacts. Radially inwardly of the right-hand set of contacts (Fig. 8) and arcuately coextensive therewith, is a single contact plate element 104, while a like contact element 105 is similarly arranged with respect to the left-hand set of contacts.

Figure 8:
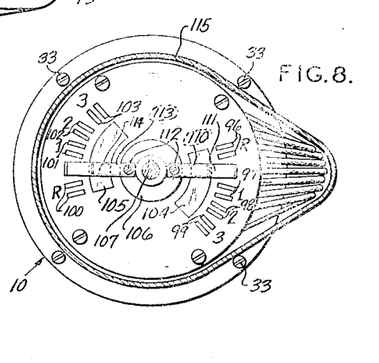
Fig. 8 is a transverse section through one end of the device, as taken along line 8—8 in Fig. 7.

The rotary contact-bridging elements of the switch are supported upon an insulating flanged hub 106 pivotally mounted on the axial portion of the disc, the hub being operatively connected to a stub-shaft 107 recessed in one end for the operative reception of one end 108 of a flexible switch-actuating shaft 109. A pair of electrically connected spring-contacts or switch blades 110 and 111 are secured to the flanged hub, as by the screws 112, the contact 110 electrically engaging at all times the contact element 104, while the other element 111 is arranged for selective engagement with the adjacent paired contacts. As a result, in a given position of the switch blades, the blade 111 serves to bridge the elements of one of the paired contacts corresponding to the given switch position, while both switch blades cooperate in bridging the paired contacts engaged by blade 111, with the contact element 104. A similar pair of switch blades 113 and 114 operate in the same manner with respect to the opposite set of paired contacts and contact 105, but the paired switch blades are insulated one from the other, through the insulated hub 106, as will be readily observed. It is to be noted here that a switch-open condition obtains when the opposite switch blades 111 and 114 are disposed respectively, in the zones between paired contacts "R" and "1," as shown in Fig. 8, this position of the switch corresponding to the 'neutral' condition of the gear-shift device, as will later appear.

The switch structure is enclosed by a cover 115 secured to the plate 31, as by the screws 33 which serve to secure plate 31 to the cylinder 28. An aperture 116 is provided in the cover, through which the stub-shaft 107 extends, the aperture being defined by a flange portion 117 which is externally threaded to receive a collar 118 serving to secure the end 119 of a flexible tube 120 to the cover. The tube 120 encloses the flexible switch-actuating shaft 109, and both extend over the foot board and upwardly along the steering wheel column (Figs. 1 and 4) to a frame member 121, the latter being clamped or otherwise secured at one end 122 to the steering column, as by the bridge piece 123 and bolts 124. The frame 121 is located substantially adjacent to and beneath the steering wheel 14, with its outer end portion 125 extending beyond the steering wheel rim and formed to provide a segmental plate element 126 for a purpose presently appearing.

Figures 3, 4, 5, 6:
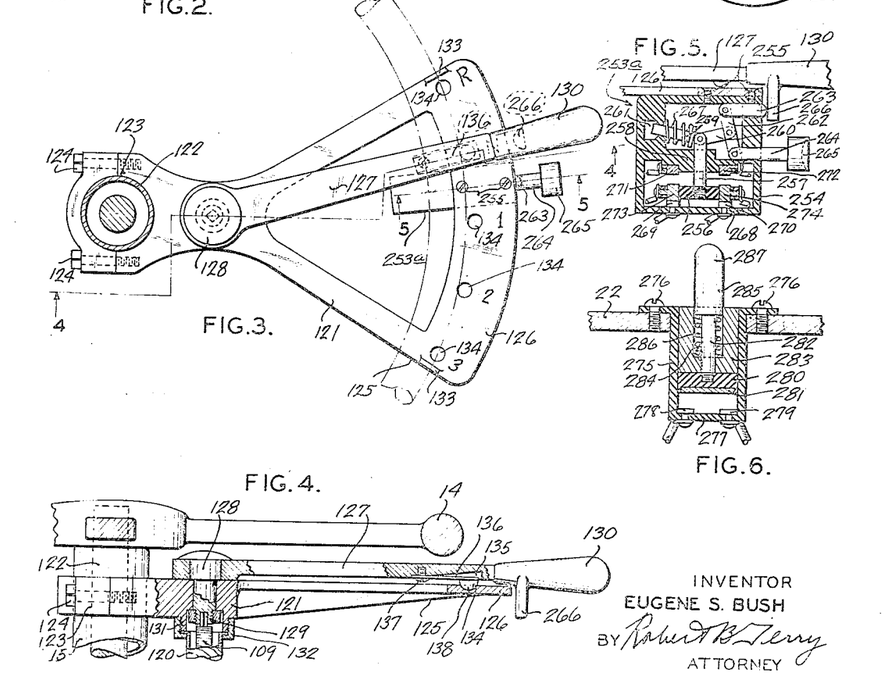
Fig. 3 is an enlarged plan view of a manual control means for the shifter device, shown as mounted on the steering column, the plan view of the control being taken from line 3—3 in Fig. 2.
Fig. 4 is a sectional elevation of the control means, as viewed along line 4—4 in Fig. 3.
Fig. 5 is a sectional elevation of a portion of the control means shown by Fig. 3, as viewed along line 5—5 therein.
Fig. 6 is an enlarged sectional view of a clutch-actuated control switch utilized in the control of the gear-shift device, the section being taken along line 6—6 in Fig. 2.

A switch-actuator arm 127 is operatively secured at one end to a pin 128 pivotally carried by the frame adjacent the steering column (Fig. 4), the pin extending through the frame for operative connection as at 129, to the switch shaft 109. The opposite end of the arm 127 is provided with a handle 130 for manual manipulation of the arm, movement of which attains through the pin 128, rotation of shaft 109 and hence actuation of the switch blades heretofore described. As shown in Fig. 4, the end of the shaft tube 120 is connected to an externally threaded flange 131 formed on the member 121, through a threaded collar 132, thus completing the enclosure of the shaft 109.

Pivotal movement of the arm 127 is limited by stops 133 at opposite ends of the segmental plate 126, while a yieldable retention of the arm is any one of a plurality of control positions relative to the plate 126, is attained in the following preferred manner: Substantially equally radially spaced on the plate 126 are a plurality of semi-spherical depressions or seats, there being five such seats in the present example, indicated at 134 (Fig. 3). The under surface of that portion of the arm 127 overlying the plate is provided with a slot 135, and carried by the arm is a leaf spring 136 secured at one end by a screw 137, the spring being in register with the slot so as to enter the same when upwardly depressed. The free end of the spring supports a semi-spherical ball element 138 which normally seats in one of the plate depressions 134. Thus as the arm 127 is actuated, the ball 138 rides out of its seat in one of the depressions 134, permitted by the leaf spring, and then snaps into another seat as the arm and its ball are brought into seat-register.

For control purposes, the several seats 134 are provided with suitable indicia on the plate 126, as shown in Fig. 3, wherein the uppermost seat is indicated by the letter "R," the next adjacent seat by the letter "N" (shown in dotted lines beneath the arm 127), and the next three seats indicated consecutively by the numerals "1," "2" and "3," the indicia indicating respectively, reverse speed, neutral, first, second and third speed conditions of the transmission assembly.

In the operative relation of the manual actuator 127 to the switch blade assembly of the switch 62, positionment of the arm 127 so that its ball element engages the seat "R" on plate 126, effects through the flexible shaft 109, a corresponding positionment of the switch blades in contact with the contacts "R." Actuating arm 127 to the neutral seat "N" effects a neutral or open condition of the switch, wherein the switch blades are then disposed in the space between contacts "R" and "1" as in Fig. 8. Further movement of arm 127 to seat "1" effects switch blade contact with contacts "1," and similarly as to seats "2" and "3" and like numbered switch contacts.

Turning now to the circuit controlling switch assemblies disposed at the opposite end of the gear-shift device, there are two such switches indicated generally at 138a and 138b, both actuated by the armature members as will later appear. An insulating switch contact supporting structure of annular form is secured, as by screws 139, to the end plate 32, the structure comprising an inner annular block 140 and an outer annular block 141. Describing first the switch 138a, the inner block is formed to provide an annular recess 142 for the reception of the flange portion 143 of a contact disc 144, the disc being operatively connected to a portion of shaft 66 which projects outwardly beyond plate 32, as by a key element 145 engaging an axially extended key-way 146 in the shaft. In this manner, the disc is confined against axial displacement with the shaft 66 (the shaft being arranged for axial displacement as well as rotary movement, as heretofore described), but follows the rotary movement of the shaft. The extended key-way, of course, serves to permit axial displacement movement of the shaft relative to the disc.

A pair of diametrally opposed contact segments 147 and 148 are, by preference, embedded in the periphery of disc 144, being insulated from each other by reason of the insulating properties of the disc. Projecting inwardly of the annular block 140 are a plurality of radially spaced, pairs of contact brushes 149, 150 and 151, each brush being urged by a spring 152, inwardly against the peripheral face of disc 144 (Fig. 9), and each provided with a conductor terminal connection. The switch arrangement is such that the paired brushes 149 and 151 are diametrally opposed, while the third pair 150 is displaced at substantially a right angle thereto. Hence, the segments 147 and 148 may bridge respectively, the paired brushes 149 and 151 at a given time, while rotation of disc 144 through a ninety-degree arc in either direction will serve to effect a bridging of paired brushes 150 by one or the other disc segment.

Describing now the other armature switch 138b and referring to Figs. 7, 12 and 13, the outer end 154 of shaft 66 is somewhat reduced in diameter, providing a shoulder 155. Seated upon the shaft end 154 is a collar element 156 formed of insulating material, the inner end of the collar abutting the shaft shoulder 155. The collar is secured upon the shaft for rotative as well as axial-displacing movement therewith, by a clamping nut 157 threadedly engaging the outer end of the shaft. Carried by the collar and preferably embedded in a peripheral portion thereof intermediate its ends, is an annular contact element or ring 158 which cooperates with contact elements on the block 141. The latter contacts are comprised of diametrally opposed contact brushes 159 and 160 arranged in an intermediate portion of the block 141 and engaging the peripheral surface of the collar 156; diametrally opposed brushes 161 and 162 displaced substantially ninety degrees from brushes 159 and 160, and arranged near the outer end of the block, in a transverse plane spaced from but parallel to the transverse plane of the contacts 159–160, and a third set of diametrally opposed brushes 163 and 164 arranged in parallel longitudinally of the brushes 161–162, but disposed near the inner end of the block and in a transverse plane spaced from but parallel to the transverse plane of brushes 159–160. Each of the several brushes is urged against the collar by a suitable spring 165 and each is provided with a suitable conductor terminal connection. The switch assembly 138b just described, is actuated solely by axial displacement of the collar, as effected by the shaft 66 in response to such movement of the armature structure heretofore described. The control function of both switches 138a and 138b will hereinafter appear.

Figure 9:
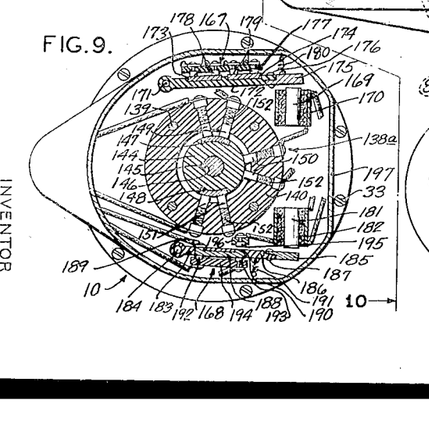
Fig. 9 is a transverse section of the device near the opposite end thereof, as viewed from line 9—9 in Fig. 7.

As shown by Figs. 7 and 9, the end plate 32 is utilized to support limit switch assemblies 167 and 168, located on opposite sides of the block structure 140—141. The switch assembly 167 comprises a magnet core 169 and energizing winding 170 therefor, secured in any desired manner (not shown) to the plate 32, and an arm structure pivoted to plate 32, as at 171. The arm includes an insulated portion 172 supporting spaced contact plates 173 and 174, and a magnetic armature portion 175 adjacent the core 169, the two portions being secured together by a suitable screw 176. Carried by the plate 32 and arranged adjacent the arm portion 172, is an element 177 of an insulating material, which supports paired contacts 178 and 179, the arrangement of these contacts being such that plate 173 serves to bridge contacts 178, while plate 174 serves to bridge contacts 179. The pivoted arm structure is biased to effect such contact bridging relation, as by a spring 180, the switch being opened upon energization of core 169 which attracts the armature 175 and thus pivots the arm to break the switch circuit.

The other switch assembly 168 is of the double-acting type, being comprised of a magnet core 181 and energizing winding 182 therefor, and an arm structure 183 pivoted to the plate 32, as at 184. The pivoted arm includes an armature element 185 adjacent core 181 and an insulated portion 186 to which the armature is connected, as by the screw 187. The arm portion 186 supports a contact bridging element 188 on one side thereof, provided with a conductor terminal connection 189 and a contact portion 190 projecting to the opposite side of the arm. The arm is urged by a spring 191, away from the core 181 and into a position wherein the bridging element 188 interconnects spaced stationary contacts 192 and 193 carried by an insulating member 194 secured to plate 32. On the opposite side of the arm is arranged a single contact 195 supported by an insulating member 196 secured to plate 32, this contact being engaged by the contact portion 190 of element 188 when the arm is actuated in response to energization of the core 181.

Enclosing the switch structures hereinabove described, is a cover 197 which is secured to plate 32, as by the screws 33 which serve to secure plate 32 to the cylinder 28.

The automatic control for the gear-shifter device is illustrated in Figs. 1, 18, 19 and 20, and comprises essentially a speed-governor controlled switch mechanism which may be operatively inserted in the drive shaft for the usual automotive speedometer. The mechanism is enclosed by a housing 198 which is by preference, secured to the transmission housing 199 as by bolts 200. Journalled in the housing 198 is a shaft 201 which projects at each end, through and outwardly beyond the housing walls. One projecting end 202 of the shaft is operatively connected to a short shaft portion which may be integral with a pinion 203, in mesh with a drive gear 204 on the vehicle drive shaft 205 leading from the transmission assembly. Shaft 201 is thus driven from the vehicle drive shaft and hence its speed is directly proportional to the speed of the vehicle. The opposite projecting end 206 of shaft 201 is connected to a speedometer drive shaft or cable 207 which may lead to the usual vehicle speedometer (not shown).

A ball-type governor assembly is mounted on shaft 201, the assembly including a collar 208 secured to the shaft as by a pin 209. The collar cooperates with a member 210 slidably sleeved on the shaft, in the pivotal support of arms 211 and 212 which support inertia elements such as ball-weights 213. Member 210 is axially spaced from the collar, and encircling the shaft between these elements is a compression spring 214 which serves to bias member 210 away from the collar. In the operation of the vehicle, the centrifugal influence of the weights will effect axial displacement of the member 210 along shaft 201, and such movement of the member is utilized to actuate a switch mechanism located within the housing 198 and indicated generally at 215.

Figure 20:
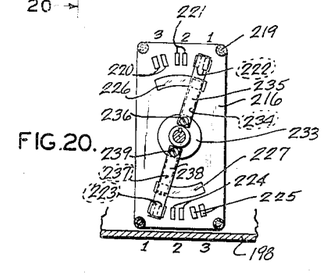
Fig. 20 illustrates a control switch associated with and actuated by the vehicle-speed responsive mechanism, the view thereof being taken along line 20—20 in Fig. 19.

The switch is comprised of a base plate 216 formed of insulating material and provided with corner projections or feet 217 which serve to space the plate inwardly of a wall portion 218 of the housing, to which the plate is secured, as by screws 219 engaging the feet 217. At one end of the plate are located a plurality of paired contacts 220, 221 and 222, while at the opposite plate end are located similar paired contacts 223, 224, and 225. The upper and lower sets of contacts (Fig. 20) are each arranged in an arc the axis of which is substantially the center of the plate. Secured to the plate inwardly adjacent the contacts 220—222 is an arcuate contact segment 226 which is substantially coextensive with the arcuate extent of the contacts, while similarly located with respect to the contacts 223—225 is a like contact segment 227. A switch shaft arranged below and at a right angle to the governor shaft 201, 228 has its ends journalled in housing walls 218 and 229, as at 230 and 231 respectively. The shaft extends through the center of plate 216, and operatively secured thereto is a sleeve 232 formed of insulating material and provided with a flange 233. Carried by the flange are a pair of spring contacts 234 and 235, being connected together and to the flange by a screw 236. The spring contact 234 engages the segment 226, while the contact 235 is arranged for engagement with the paired contacts 220—222. Diametrically opposite the spring contacts 234—235, are similar spring contacts 237 and 238 secured together and to the flange 233 by a screw 239, the two sets of switch arms being insulated from each other by the insulating flange. Spring arm 237 engages segment 227, while arm 238 engages contacts 223—225. As will be observed in Fig. 20, the switch arm arrangement is such that when the spring contact 235 is disposed in bridging relation to paired contacts 222 (the arm 234 serving, through arm 235, to connect the segment 226 to the contacts 222, the opposite arm 238 bridges the paired contacts 223 (the associated arm 237 through arm 238, connecting the segment 227 to contacts 223). A like condition obtains between the switch arms and the opposed paired contacts 221 and 224, and similarly with opposed paired contacts 220 and 225. In Fig. 20, the numeral "1" is applied to paired contacts 222 and 223, indicating these as the control contacts for "first speed" condition of the transmission and its shifter device; the numeral "2" to paired contacts 221 and 224, indicating "second speed" control contacts, and the numeral "3" to paired contacts 220 and 225, indicating these as the "third speed" control contacts.

Figure 18:
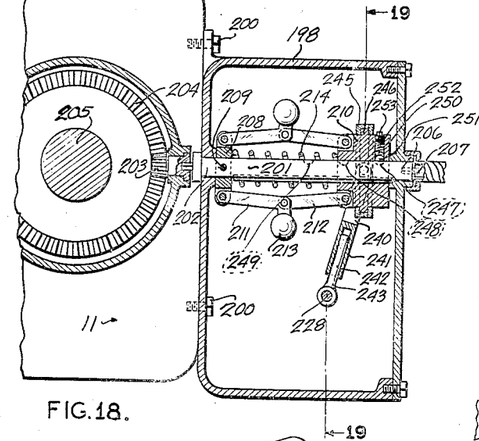
Fig. 18 is an enlarged section through a speed-actuated control mechanism for the gear-shifter device, as viewed from line 18—18 in Fig. 2; the mechanism being shown as driven from a gear on the vehicle drive shaft.
Figure 19:
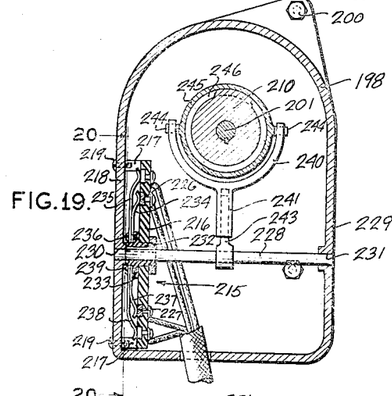
Fig. 19 is a transverse section through the vehicle speed responsive control mechanism, as viewed from line 19—19 in Fig. 18.

The switch is operated through actuation of its shaft 228 by the governor mechanism. The operative connection between the shaft and governor sleeve 210 is effected preferably by a yoke 240 provided with a stem 241 which is bored to receive a plunger 242 operatively connected at its end 243 to the shaft 228 (Figs. 18 and 19). The yoke arms are pivotally secured to ears or projections 244 formed on a ring assembly 245 which is secured to a flanged portion 246 of the governor sleeve 210. In this manner, axial displacement movement of the sleeve is transmitted as rotary movement to the shaft 228, through the yoke and plunger, the relative movement between the yoke stem and plunger permitted by the arrangement, being provided for an obvious reason.

In the present example, the position of the switch arms when the vehicle is at rest, is as shown in Fig. 20 wherein contacts "1" are bridged. Provision is made in the governor assembly for maintaining such switch position as the vehicle accelerates in speed and until a predetermined vehicle speed is attained. As shown in Fig. 18, the governor shaft or spindle 201 is provided with longitudinally aligned, semi-spherical seats 247, 248 and 249 which are relatively spaced a predetermined extent. The sleeve 210 is provided with a lateral bore 250 open to the governor shaft, in which is disposed a ball element 251 which is biased against the shaft by a spring 252 arranged in the bore and between the ball and a bore-closure element 253. In the vehicle-at-rest condition, the ball seats in the spherical seat 247, and serves releasably to lock the sleeve to the shaft. The spring 252 utilized in the arrangement, is of a predetermined compressive or biasing force such that it will maintain the ball in seat 247 as the governor mechanism operates during vehicle acceleration up to a predetermined speed.

Upon attaining such predetermined speed, the centrifugal force of the governor weights which opposes the spring force tending to maintain the ball in seat 247, overcomes the spring force and effects axial displacement of the sleeve toward the collar 208 and against the resistance offered by the governor spring 214. As the sleeve is displaced, the ball rides into the next adjacent seat 248, whereupon the sleeve is again releasably locked to the spindle. In this second position of the sleeve, the switch has been actuated thereby to bridge contacts "2," and this condition is maintained throughout the "second speed" range of the vehicle. When the vehicle attains "third" or "running speed," the sleeve is again displaced until the ball rides into the third seat 249, in which position of the sleeve relative to the spindle, the switch will have been actuated to bridge contacts "3." The last described sleeve and switch positions are maintained by the spring-biased ball in seat 249, throughout the "running speed" range of the vehicle, as in this instance, the governor spring 214 is compressed to substantially its maximum extent, thereby precluding further inward displacement of the sleeve.

As the vehicle speed is decelerated from "running speed" through "second" and "first" speeds, to minimum or zero speed, the operation of the sleeve and switch is the reverse of that above described. It is desired to point out here as a particular feature of the governor switch control, that during vehicle acceleration or deceleration from one transmission speed range to another, that sleeve displacement from one ball seat to another is effected by a snap-action, whereby the switch is operated with a corresponding snap-action, this being desirable to effect a positive and quick circuit-change through the switch.

Before describing the circuit connections for the apparatus above described, reference is made to Fig. 5 in which is shown a preferred form of circuit-interlock switch indicated generally at 253a, which is provided for effecting a change-over in the circuit control arrangement, from manual control of the gear-shift device to automatic control thereof by the governor actuated switch. This switch has its parts mounted in a housing 254 which for convenience in respect to operator-accessibility, is suspended from the plate 126 carried by the steering-wheel column (Fig. 3), securement thereof to the plate being effected by suitable screws 255. The switch, which is of toggle type, comprises a movable switch contact support 256 formed of insulating material and operatively secured to one end of an element or rod 257. The rod is slidably journalled in an internal transverse wall portion 258 of the housing, and is operatively connected on its opposite end to a pair of pivotally connected toggle members 259 and 260. The free end of the member 259 is pivotally seated in a housing wall recess 261, while the free end of member 260 is pivotally connected to substantially the mid-point of a bar 262. Pivotally connected to one end of bar 262 is a plunger element 263 which projects through a wall portion of the housing, and pivotally connected to the opposite end of the bar is a similar plunger 264 which also projects through a wall of the housing and in parallel to the plunger 263. A knob 265 is provided on the outer end of plunger 264 for manual actuation thereof. The projecting end of plunger 263 is in line with a finger element 266 depending from the switch-actuator handle 130, so that when the handle and its arm 127 are actuated to the zone of the plunger 263, the finger 266 will engage the rounded end of the plunger and displace the plunger inwardly of the housing. The location of the switch and hence of the plunger 263 is by preference, between the "neutral" and "first speed" positions of the handle 130 (Fig. 3), so that depression of the plunger will occur during handle movement between these zones. Depression of the plunger 263 serves to effect an over-center condition of the toggle members 259 and 260, to the position indicated in Fig. 5, such position being releasably retained by a toggle spring 267 sleeved on the toggle member 259. Such condition of the toggle members positions the switch contact support 256 adjacent the lower or bottom wall 268 of the housing, as shown. Actuation of the toggle mechanism to its opposite over-center condition, effected by the manual operation of plunger 264, serves to position the support 256 adjacent the wall element 258. It is to be noted that the plunger 264 is operable to effect either over-center condition of the toggle mechanism, while the plunger 263 as operated by the finger 266, may effect only the over-center condition shown by Fig. 5.

Supported by the lower housing wall 268 are spaced contacts 269 and 270, while similarly carried by the internal housing wall 258 are contacts 271 and 272 in vertical register, respectively, with the lower contacts 269 and 270. Supported by the movable member 256 are contacts 273 and 274 insulated from each other by the insulating member 256. In the lower position of member 256, contacts 273—269 and 274—270 are engaged, while in the upper position, contacts 273—271 and 274—272 are engaged.

Fig. 6 illustrates a preferred form of clutch pedal actuated switch which, when closed upon operation of the pedal to effect clutch-disengagement, serves to complete the energizing circuit for the gear-shift device, as will presently appear in the description of the circuit connections for the system. The switch, which may be termed a "master switch," includes a housing 275 which is mounted in the foot-board 22 and adjacent the clutch arm 16, being secured to the board by screws 276. The housing is formed of insulating material and carries in the bottom wall 277 a pair of contacts 278 and 279. Slidably journalled in the housing is an insulating disc 280 which carries a contact plate 281 adapted to bridge the contacts 278 and 279 upon depression of the disc in the housing. The disc is carried on one end of a rod 282 slidably journalled in a stationary member or plug 283 secured in the housing in any suitable manner. The rod extends into an axial chamber or bore 284 in the plug and is provided at its opposite end with a plunger element 285 which seats in the bore. A compression spring 286 encircles the rod portion within the bore 284 and serves to displace the plunger and its rod upwardly of the plug and so as to project the end portion 287 of the plunger upwardly beyond the housing, as shown in Fig. 6. Such movement of these parts effected under the influence of the spring bias, is limited by abutment of the rod-supported member or disc 280 with the inner end of the plug, while movement of the plunger, rod and disc inwardly of the housing, is limited by abutment of the disc-carried contact plate 281 with the contacts 278 and 279, in which position the latter contacts are bridged to complete the circuit therethrough.

In the assembly relation of the switch and clutch-pedal 17 (Fig. 2), the plunger 285 is disposed in the path of clutch-pedal movement, so that when the clutch pedal is depressed to effect a clutch-disengagement, the pedal will engage the upper or free end of the plunger and displace the same inwardly of its seat 284, against the bias of spring 286. As a result, the contact disc 280 will be displaced to effect a circuit closure of contacts 278 and 279 by the plate 281. Release of the clutch pedal to effect reengagement of the clutch, will permit spring 286 to effect in the manner described, an open-circuit condition of the switch.

Figure 21:
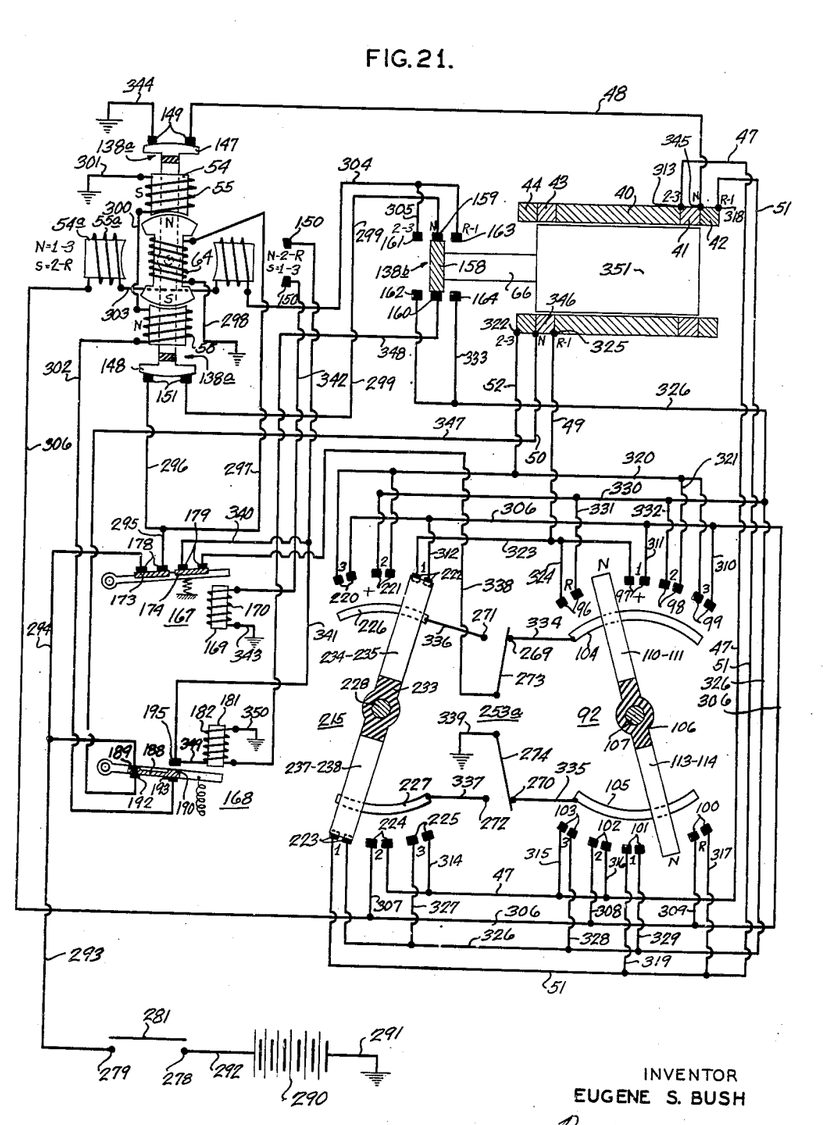
Fig. 21 illustrates the circuit connections including a general wiring diagram of the device and its control elements.

Fig. 21 illustrates the electrical circuit connection for the speed-change device and switch mechanisms hereinbefore described, these elements being shown partly in a structural, and partly in diagrammatic manner to facilitate an understanding of the circuit arrangement. A source of electrical energy for the system, is provided by a battery 290 which may be the usual automotive vehicle battery conventionally serving to supply the vehicle ignition and lighting systems. The negative terminal of the battery is grounded through a conductor 291, to a portion of the vehicle frame, as is usual practice. The positive battery terminal is connected by lead 292, to the contact 278 of the clutch-pedal actuated master switch, while the opposite contact 279 of the switch is connected to the switch arm terminal 189 of limit switch 168, as by a lead 293, and to one of the paired contacts 178 of limit switch 167, by a branch lead 294. The other contact of the pair 178 is in circuit through a lead 295, with branched leads 296 and 297, the branch 296 being connected to one of the paired contacts 151 of the armature actuated switch 138a, and the branch 297 to one terminal of the armature winding 64, the opposite winding terminal of which is grounded through lead 298. The opposite contact of the pair 151 is connected by a lead 299 to the contact 159 of the other armature actuated switch 138b.

The armature pole windings 55 are connected in series by a conductor 300, while the terminal of one is grounded through a lead 301, and the terminal of the other connected to contact 193 of limit switch 168, as by a lead 302. The windings 55a of the other set of armature poles 54a are also connected in series, as by a conductor 303, while the terminal of one thereof is connected by a lead 304 to the armature switch contact 163, and also to the contact 161 thereof, as by a branch lead 305. The terminal of the other winding is connected to a lead 306 which has its terminus at one of the paired contacts 220 of the governor controlled switch 215. In circuit with lead 306 are branch conductors 307, 308, 309, 310, 311 and 312 which are connected respectively, to one of the paired contacts 224 (of governor switch 215), 102, 100, 99, 97 (these four on manual switch 92), and 222 (on governor switch 215). Considering the other contact of each of the paired contacts above noted, that of contacts 224 is connected as by lead 47 heretofore noted, to the series connection 313 between field coils 40 and 41, while branched from this lead 47 are leads 314, 315 and 316 which are connected respectively, to one of the contacts 225 on governor switch 215, to one of the contacts 103 on manual switch 92, and to the opposite or other one of contacts 102 on the same switch; the other contact of the pair 100 is connected by a lead 317 to conductor 51 leading from the end terminal 318 of field winding 42, the conductor 51 extending to one of the contacts 223 of governor switch 215, while a branch lead 319 connects conductor 51 to one contact of the pair 101 on manual switch 92; the other contact of the pair 99 on manual switch 92 is connected by a lead 320 to the remaining contact of the pair 220 on governor switch 215, while branch leads 321 and 52 (heretofore noted) connect respectively, the lead 320 to one of the paired contacts 98 on the manual switch, and to the end terminal 322 of field winding 44; the other contact of the pair 97 is connected by a conductor 323, to the remaining contact of the pair 222 on governor switch 215, while branch leads 324 and 49 (heretofore noted) serve to connect respectively, the conductor to one of the paired contacts 96 on manual switch 92 and to the series connection 325 between field windings 40 and 43.

Completing the circuit connections for the remaining contacts of the manual and governor switches, the opposite contact of the pair 223 on the governor switch is connected by a conductor 326, to the contact 162 of the armature switch 138b. Conductor 326 is also in circuit with the remaining contacts of the pairs 225 (on governor switch 215), 103 and 101 (the latter on the manual switch), as by the respective branch leads 327, 328 and 329. Further, a lead 330 connects conductor 326 to the remaining contact of the pair 221 on the governor switch, while branches 331 and 332 from lead 330, are connected respectively, to the remaining contacts of the pairs 96 and 98 on manual switch 92. A branch lead 333 from conductor 326, is connected to the contact 164 of the armature switch 138b.

The contact segments 164 and 165 of the manual switch are connected respectively, as by respective leads 334 and 335, to the contacts 269 and 270 of the interlock switch 253a, while the similar segments 226 and 227 of the governor switch are connected respectively, as by the respective leads 336 and 337, to the interlock switch contacts 271 and 272. The interlock switch arm 273 controlling contacts 269 and 271, is in circuit with one of the paired contacts 179 of limit switch 167, as through a lead 338, while the other switch arm 274 thereof is grounded through a lead 339. The opposite contact of the pair 179 is connected by a branch lead 340 to a conductor 341, the conductor being connected at one end to the contact 195 of limit switch 168, and at its other end to one of the contacts of pair 150 on the armature switch 138a. The opposite contact 150 is connected by a lead 342, to one terminal of relay coil 170 on limit switch 167, the other terminal of which is grounded through a lead 343.

On the armature switch 138a are paired contacts 149, one of which is grounded through a lead 344, while the other is connected through the lead 48 heretofore noted, to the series connection 345 between field windings 41 and 42. Further, the series connection 346 between field windings 43 and 44, is connected by a lead 347, to the contact 192 of the pair 192—193 on limit switch 168. Completing the circuit arrangement is a conductor 348 which serves to connect the contact 160 of the armature switch 138b to one terminal of the relay coil 182 of limit switch 168, the latter terminal also being connected to contact 195 by a lead 349. The opposite coil terminal is grounded through a lead 350.

Fig. 21 illustrates the relative positions of the operative elements of the system in their initial or de-energized condition, as with the clutch-pedal switch open; the limit switch 168 is shown as de-energized and in position to bridge contacts 192—193; the limit switch 167 de-energized and in position to bridge respectively the paired contacts 178 and 179; the manual switch 92 in "neutral"; the governor switch 215 in position to bridge paired contacts 222 and 223; the switch element 158 of the armature switch 138b in position to bridge contacts 159 and 160, and the switch elements 147 and 148 of the other armature switch 138a in position to bridge respectively, contacts 149 and 151, leaving the contacts 150 thereof in open-circuit condition. Also, the armature windings 55, 55a and 64 are de-energized, as are the field windings 40 through 44. It is to be noted that the armature core structures 53 and 60 heretofore described, are illustrated in the upper left portion of Fig. 21, and also in the upper right portion of the figure, in relation to the field windings 40—44, the latter view thereof being shown as a composite cylinder 351 in centralized relation to the winding assembly. The centralized relation of the core structure 351 to the field windings is the normal initial or "neutral" position thereof, which serves to position armature switch 158 in bridging relation to the contacts 159—160. The location of armature switches 147 and 148 in respective bridging relation to contacts 149 and 151, is effected as an initial condition, by the initial or "neutral" position of inner armature 60 such that its poles underlie poles 55 of the outer armature 53. (Figs. 21 and 11.)

As will be observed in Figs. 7, 8, 10, 11 and 12, the several conductors leading to the field windings, the armature windings, the manual switch, the two armature switches and the limit switches (all being parts of the speed-change or shifter device shown in assembly in Fig. 7), are for convenience and compactness of wiring assembly, arranged along a side of the casing 28, and are enclosed by a cover 352 secured to the casing by screws 353. Also, those leads connecting the governor switch to the gear-shifter mechanism, are enclosed by a cable 354 (Figs. 1, 2, 7 and 19).

Considering the operation of the mechanism, the initial step generally necessary to effect a gear-shift in the transmission, is to disengage the clutch as by pushing downwardly on the clutch pedal. As before noted, such actuation of the clutch pedal effects a closure of the battery-circuit switch 281 which when thus closed, completes several initial energizing circuits for the mechanism, as will now appear.

Closure of the battery switch completes a circuit to armature windings 55, as from the positive terminal of the battery through circuit elements 292; 278; 281; 279, 293; 189; 188; 193; 302; windings 55 and series connection 300 thereof; 301 to ground and thence to the grounded lead 291 connected to the negative terminal of the battery. The armature winding 64 is also energized, as from the battery through circuit elements 292; 278; 281; 279; 293; 294; 178; 173; 295; 297; winding 64; grounded lead 298 and thence to the battery negative terminal through grounded lead 291. As a result of the armature energization described, the windings 55 produce a magnetic field for the inner core 60, such that the poles of armature core 60 will be magnetically drawn into register with the poles 54 of armature core 53. Thus the armature windings 55 (and 55a as will later appear) serve as field windings for the inner armature. The resulting rotary movement of core 60 effects, as heretofore described, closure of paired armature switch contacts 149 and 151 by the respective elements 147 and 148. Closure of the above contacts completes an energizing circuit for the field windings 40, 41 and 43 in series, as from the battery through circuit elements 292; 278; 281; 279; 293; 189; 188; 192; 347; 346; field windings 43, 40 and 41; 345; 48; 149; 147; 344 to ground and thence to battery negative lead 291. Energization of these intermediate, series-connected sections of the field winding, creates a magnetic field which serves longitudinally to centralize the armature assembly (351 in Fig. 21), with respect to the field assembly.

With the armature cores positioned relative to each other as described, and also with the armature assembly centralized with respect to the field assembly as described, the transmission gear-shift lever 91 under the control of the armature elements through the forked arm and pivoted lever system heretofore described, will be positioned "in neutral" and particularly in the center of its neutral travel. At the same time, centralizing of the armature assembly with respect to the field assembly, effects a positionment of armature switch 158 in contact-bridging relation to contacts 159—160, this as noted hereinbefore. Closure of contacts 159—160 by the switch element 158 serves to complete an energizing circuit for the limit switch 168, as from the battery through circuit elements 292; 278; 281; 279; 293; 294; 178; 173; 295; 296; 151; 148; 299; 159; 158; 160; 348; relay winding 182; via lead 350 to ground, and thence to the battery negative lead 291. Current flow through the relay coil 182 magnetically energizes the core 181 which in turn attracts the switch arm, and thereby open-circuits the contacts 192—193 and effects a closure of contacts 190—195, the open-circuit at contact 192 serving to de-energize the field windings 43—40—41, while the open circuit of contact 193 serves to de-energize the armature windings 55. A holding circuit for the relay coil 182 is thereby set up, as by circuit elements 292; 278; 281; 279; 293; 189; 188 and 190; 195; 349; coil 182; grounded lead 350 and thence to battery negative lead 291. At the same time, the interlock switch 253a is placed in circuit with the battery, as from the positive side of the battery through the circuit elements 292; 278; 281; 279; 293; 189; 188; 190; 195; 341; 340; 179; 174; 338 to the movable arm 273 of switch 253a, the other arm 274 of which is permanently in circuit with the battery negative lead 291 through the grounded lead 339.

The above initial circuit conditions are effected solely by closure of the clutch-actuated switch 281, being attained in every instance of such switch closure. By this initial arrangement of the mechanism and the noted circuit elements, the system is conditioned for effecting a shift of the transmission speed-change gearing by operation of the speed-change or gear-shifter device, as effected by either the manually actuated switch 92 or the governor switch 215. Selection of the manual or governor switch for control of the device is attained through the interlock switch 253a, as by manipulating the switch to effect engagement of its arms 273 and 274 with the respective contacts 269 and 270 for control by the manual switch, or to effect engagement of the arms respectively with the contacts 271 and 272 to enable control by the governor switch.

Describing the operation of the device by manual switch control thereof, and assuming the initial circuit conditions to be set up as above described, the proper setting of the interlock switch for manual control may be effected either by pulling outwardly the toggle-actuator handle or knob 265, or by swinging the manual switch actuating handle 130 in a direction to cause contact of its finger 266 with the toggle-actuator plunger 263, so as to displace the plunger inwardly of the switch housing. In either method for pre-setting the interlock switch, the toggle mechanism will be actuated to an over-center position in which the switch elements 273 and 274 engage respectively, the contacts 269 and 270, as in Fig. 21. The system is now conditioned for manual control through actuation of switch 92 by the handle 130.

Assuming first that it is desired to reverse the transmission drive or in common terminology "shift into reverse," the handle 130 is actuated to the position "R." This effects, through the flexible shaft 109, a corresponding location of the switch blades in bridging relation to paired contacts "R" of switch 92 (Figs. 8 and 21). As a result, energizing circuits for the armature and field elements of the gear-shifter device are set-up which cause these parts to operate in a manner to actuate lever 91 into its transmission gear reverse position, the relative positions of the elements and lever 91 "in reverse," appearing diagrammatically in Figs. 14 and 14A. The circuits set-up are as follows: From the positive side of the battery 290 through circuit elements 292; 278; 281; 279; 293; 189; 188 and 190; 195; 341; 340; 179 and 174; 338; 273; 269; 334; switch segment 104; blades 110—111; a contact 96; 324; 323; 49; 325; field windings 40, 41 and 42 in series; 318; 51; 317; one of contacts 100; switch blades 113—114; switch segment 105; 335; 270; 274; 339 to ground, and thence to the negative battery lead 291. The resulting field produced by windings 40, 41 and 42 acting in series, magnetically displaces the armature core assembly (cores 53 and 60) indicated in Fig. 21 as 351, to the right in the figure. This armature movement serves through the forked member 72 and pivoted lever 78, to shift lever 91 to one end of its travel "in neutral" (to the left in Figs. 14 and 14A).

Figures 14, 14A:
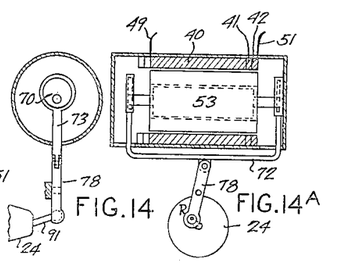
Figs. 14 and 14A are companion figures illustrating diagrammatically the positions of the operative elements of the device when actuated for effecting a "reverse" condition of a standard speed-change transmission.

As the armature assembly is displaced longitudinally, it shifts the armature switch element 158 carried by the armature shaft 66, into bridging relation to contacts 163-164. The following armature energizing circuit is completed thereby; from the battery positive terminal through the circuit elements 292; 278; 281; 279; 293; 189; 188 and 190; 195; 340; 179 and 174; 338; 273; 269; 334; 104; blades 110—111; the other contact 96; 331; 330; 326; 333; 164; 158; 163; 304; armature windings 55a and series connection 303; 306; 309; the other contact 100; switch blades 113—114; 105; 335; 270; 274; 339 to ground, and thence to the negative battery lead 291. The energizing circuit for armature windings 55a thus effected, causes these windings to excite and so to polarize the armature poles 55 that they will attract the poles of inner armature 60 and effect a substantially quarter-turn thereof into magnetic register with the poles 54a, the direction of rotation, by reason of the particular polarization in this instance, being counter-clockwise (Fig. 21). Such rotation of core 60 serves to rotate the armature switch blades 147 and 148 in corresponding direction, so as to open-circuit the contacts 149 and to bridge the contacts 150 by blade 148. The rotary movement of armature core 60 serves to effect movement of the gear-shift lever 91 from "neutral" into its "reverse" position (Figs. 14 and 14A). This is effected through a counter-clockwise quarter-turn of the eccentrics 69 and 70 as actuated by the core 60 through its shafts, which in turn produce a displacement of the forked member 72 toward the cylinder 28 of the device, and hence a compound pivotal and bodily displacement movement of the lever 78, permitted by the pin and slot mounting thereof. Such movement of the lever 78 produces the desired shifting of the lever 91 from "neutral" into "reverse" position, wherein the transmission gearing will be conditioned for reverse drive of the vehicle.

The changed circuit condition of the armature switch resulting from rotation of armature 60, effects an open-circuit at contacts 149 and 151, while effecting a closure of contacts 150 by the switch blade 148. Closure of switch contacts 150 completes an energizing circuit for the relay coil 170 of limit switch 167, as from the positive side of the battery through circuit elements 292; 278; 281; 279; 293; 189; 188 and 190; 195; 150 and switch blade 148; 342; relay coil 170; lead 343 to ground and thence to the negative battery lead 291. The relay core 169, now excited by the coil 170, actuates the switch to break the circuit connections of paired contacts 178 and 179 by the respective elements 173 and 174. The open-circuiting of contacts 179 serves to de-energize the field windings 40—41—42, while the open-circuiting of contacts 178 effects a de-energization of the armature winding 64.

The circuit connections and disconnections effected during operation of the speed-change operator to produce a "reverse" gear-shift of the transmission gearing, occur in the sequence indicated in the foregoing description, and in a positive and rapid manner. Upon release of the clutch pedal to effect clutch engagement for reverse operation of the vehicle, the switch 281 becomes open-circuited which results in a complete electrical de-energization of the system. However, the armature core elements remain in their "reverse" gear-shift position, as in Figs. 14 and 14A, throughout "reverse" operation of the vehicle.

Figures 15, 15A:
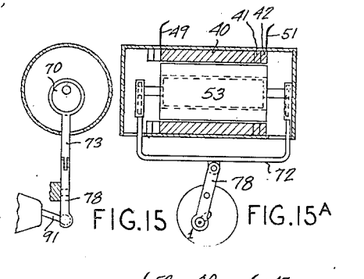
Figs. 15 and 15A are similar diagrams showing positions of parts of the control assembly corresponding to a "first speed" transmission setting.

Assume now that it is desired to effect a transmission speed-change into "first" speed. As before, the clutch is first disengaged, which results in closure of battery switch 281. Immediately, the initial circuit conditions are set up as before described. Whereupon, the handle 130 may be shifted into the position "1," producing a corresponding shift of the switch blades 110—111 and 113—114 into bridging relation respectively, to the paired contacts marked "1" on the switch. As a result, the field windings 40, 41 and 42 are energized, the circuit therefor being set up as before described for the "reverse" condition, but effected now through the contacts 97 and 101 of the manual switch 92. Such circuit may be readily traced on the wiring diagram of Fig. 21. The resultant longitudinal shift of the armature assembly 351 to the right in the figure, effects a corresponding shift of the lever 91 to one end of its travel in "neutral," preparatory to a shift thereof into "first" speed position. Also, the armature switch 158 is again shifted to bridge contacts 163 and 164, which completes an energizing circuit for the armature coils 55a, the direction of current flow therethrough being now reversed from that produced in the "reverse" shift function of the system above described. Such circuit may be traced from the battery positive terminal through the circuit elements 292; 278; 281; 279; 293; 189; 188 and 190; 195; 346; 179; and 174; 338; 273; 269; 334; 104; switch blades 110—111; one of the contacts 97; 311; 306; armature coils 55a and series connection 303; 304; 163; 158; 164; 333; 326; 329; one of the contacts 101; switch blades 113—114; 105; 335; 270; 274; 339 to ground and thence to the battery negative lead 291. The resulting energization of armature windings 55a produces a quarter-rotation of armature core 60 in a clockwise direction, by reason of the reversed current flow in the windings, the armature rotation serving to shift the lever 91 from "neutral" into "first" speed position, as shown in Figs. 15 and 15A. In this instance, the eccentrics 69 and 70 are rotated in a clockwise direction, as appears in the figure. At the same time, the rotary movement of the armature 60 actuates the armature switch 138a controlled thereby, in a clockwise direction to open-circuit the contacts 149 and 151 by blades 147 and 148 respectively, and to bridge the contacts 150 by the blade 147. As before, the bridging of contacts 150 completes an energizing circuit for operating limit switch 167, which results in open-circuiting its contacts. Release of the clutch pedal to effect clutch-engagement for operation of the vehicle in "first" speed, opens switch 281 and hence de-energizes the system. Thereafter the parts remain in "first" speed condition throughout vehicle operation in this speed ratio, and until the clutch is again disengaged.

Figures 16, 16A:
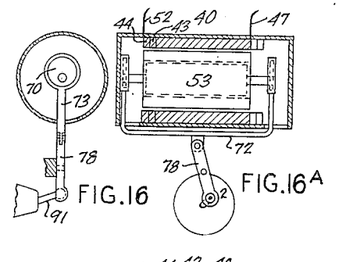
Figs. 16 and 16A are similar showings corresponding to "second speed" transmission setting.

Shifting from "first" into "second" speed, the handle 130 is actuated to the position marked "2," which actuates the switch blades 110—111 and 113—114 into bridging relation respectively, to contacts 98 and 102, marked "2." Disengaging the clutch effects a closure of switch 281 which again sets up the initial circuit conditions heretofore described. With the contacts 98 and 102 bridged, the following energizing circuit for the field windings 40, 43 and 44 is effected: From the positive side of the battery to the switch segment 104 by the circuit heretofore described therefor, thence through the switch blades 110—111; one of the contacts 98; 321; 320; 52; 322; field windings 44, 43 and 40 in series; 313; 47; 316; one of the contacts 102; switch blades 113—114; 105; 335; 270; 274; 339 to ground and thence to the battery negative lead 291. The resulting excitation of field coils 44, 43 and 40 in series, produces a magnetic field which acts to draw the armature assembly 351 to the left in Fig. 21, such displacement of the armature assembly in this instance, serving to actuate the lever 91 to the other end of its travel in "neutral," preparatory to a shift thereof into "second" speed position. The longitudinal shifting of the armature assembly to the left in the figure, serves also to shift the armature switch 158 controlled thereby, into bridging relation to contacts 161 and 162, which immediately completes an energizing circuit for the armature coils 55a. Such circuit is the same as that set up in the function of the system for effecting a transmission shift into "reverse," as hereinabove described, the only departure in this instance being that the circuit is completed through the contacts 160—161, instead of the contacts 163—164 utilized in the former circuit. The excitation of the coils 55a in this instance, as in the instance of the "reverse" set-up, is of such polarity as to produce a counter-clockwise rotation of the armature 60 by a quarter-turn, so as to effect thereby, a shifting of the lever 91 from "neutral" into "second" speed position, as shown in Fig. 16. It will be noted from this figure, that the eccentrics are rotated in the counter-clockwise direction to effect such gear-shift function of the device. At the same time, the counter-clockwise movement of the armature 60 actuates the armature switch 138a controlled thereby, so as to open-circuit paired contacts 149 and 151, and to bridge contacts 150 by the switch blade 148. As before, closure at contacts 150 completes an operating circuit for the limit switch 167, which upon functioning, breaks the energizing circuits for the field windings 44, 43 and 40 and the armature coils 55a. Release of the clutch pedal to effect engagement of the clutch, open-circuits the switch 281 which effectively de-energizes the electrical control system, leaving the parts in "second" speed position.

Figures 17, 17A:
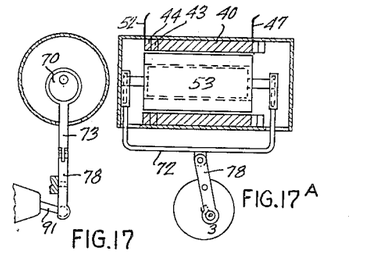
Figs. 17 and 17A similarly illustrate the parts of the control assembly in positions to effect a "third speed" transmission setting.

Disengagement of the clutch which again closes switch 281 and sets-up the initial circuit conditions, followed by actuation of the handle 130 to position "3," results in circuit connections through contacts 99 and 103 which energize the system to effect a shift of the lever 91 from "neutral" into "third" speed or normal running speed, as shown by Figs. 17 and 17A. As in the "second" speed condition, there occurs a shift of the armature assembly to the left in Fig. 21, but in this instance, rotary movement of the core 60 is clockwise, produced by an energizing circuit which is the same as that effected in the "first" speed-change hereinabove described, differing only in that the present circuit is completed through contacts 99 and 103, instead of contacts 97 and 101, as in the former case. Again, upon the function of the device to effect a gear-shift into "third" speed, the armature contacts 150 are closed and the limit switch 167 is operated thereby, to break the field and armature winding circuits, while the release of the clutch open-circuits the switch 281 to effect a complete de-energization of the system.

It is to be noted that in shifting from "third" speed into "second" and/or into "first" speed, the handle 130 is shifted to its "neutral" position preferably before or as the clutch is disengaged, after which the handle may be actuated directly to the "second" speed position, or to "first" or "third" speed positions, as desired. In each event, the desired speed-change will be effected in the manner heretofore described.

Turning now to the vehicle speed or governor actuated switch 215 which controls only "first," "second" and "third" speed-change functions of the device, the control thereby is effected automatically as distinguished from the manual control by switch 92. To render the automatic control effective, the interlock switch 253a must be actuated first, to disconnect switch 92 from the system and to connect thereto, the switch 215. This is effected by pushing in the button or knob 265, which actuates the toggle mechanism to displace the contact elements 273 and 274 into contact respectively, with contacts 271 and 272. The system is now conditioned solely for speed-change control by the vehicle-speed responsive switch 215.

It will be noted from the description hereinabove, of the wiring circuit shown by Fig. 21, that the upper paired contacts "1," "2" and "3" of governor switch 215 are respectively, in parallel circuit relation to the corresponding upper paired contacts of manual switch 92, and the same parallel relation obtains for the lower paired contacts of both switches. Accordingly, the circuit arrangements for causing a functioning of the gear-shifter mechanism to effect speed-changes of the transmission in sequence through "first," "second" or "third" speed, or directly to any one of such speeds, as attained through operation of the manual switch as heretofore described, are effected in identical manner by the operation of governor switch 215.

However, it is to be noted that the governor switch is initially, i. e., when the vehicle is at a stand-still, in such position that the paired contacts "1" are bridged, thus conditioning the circuits controlled by these contacts for effecting an immediate shift of the lever 91 into "first" speed position upon clutch-disengagement to close battery switch 281. Therefore, all that is required of the vehicle operator to effect acceleration of the vehicle in "first" speed, when the governor switch is in circuit, is to disengage or throw-out the clutch, start the vehicle engine and then let-in or engage the clutch. Whereupon the vehicle will accelerate in "first" speed, and the "first" speed drive condition of the transmission gearing will be maintained so long as the clutch remains engaged, and this irrespective of the actual vehicle speed which may be attained during the acceleration period.

While the "first" speed gear-shift condition of the transmission obtains, the vehicle may accelerate in speed slowly or more rapidly depending upon operating factors, as vehicle loading, road grades and the like. But unless abnormal or particularly adverse roadway or vehicle loading conditions obtain, the vehicle speed normally will increase. Upon the attainment of a predetermined vehicle speed, the centrifugal force produced by the governor weights will act to effect a snap-displacement of the governor sleeve as heretofore described, to a predetermined position, such movement of the sleeve serving to actuate switch 215 so as to bridge paired contacts "2." Thereafter, upon disengagement of the clutch, the switch 281 will be closed thereby and a shift of the transmission gearing into "second" speed position will occur.

As the vehicle accelerates to normal running speed, the governor mechanism again functions to actuate the switch so as to bridge contacts "3," and when the clutch is again disengaged, the transmission gearing will be shifted into "third" or running speed position. It will be obvious from the foregoing that there may be effected a shift of the transmission gearing directly from "first" to "third" or from "third" to "first" speed positions, as by allowing the vehicle speed to accelerate or decelerate respectively, between low. speed and running speed before disengaging the clutch.

While the governor actuated switch is in control of the gear-shifter mechanism, it may be desired to operate the vehicle in reverse. Accordingly, the interlock switch 253a must be actuated first, in the manner heretofore described, to reconnect the manual switch 92 in the control circuit. Thereafter, shifting of the transmission gearing into reverse may be effected by the manual switch, as before described.

Fig. 22 illustrates a preferred form of battery switch which is adapted for operation by the foot accelerator 19, this switch when utilized, replacing the clutch-pedal actuated switch 281 shown in detail by Fig. 6. The switch elements thereof are carried by a housing 360 of insulating material which may be cylindrical in form and provided with a closure 361 at one end and a flange 362 at the opposite end. The housing is inserted though the foot board 22 and is secued thereto through its flange 362, as by screws 363. The location of the housing is such that its axis is in register with the foot accelerator 19. A centrally bored plug 364 is secured in the flanged end of the housing, and slidably seated in the bore is a push-rod 365 which extends upwardly beyond the housing and into abutting engagement with the accelerator 19. The opposite end of the rod which is directed inwardly of the housing, supports a block or disc 366 which slidably engages the inner wall surface of the cylinder. The disc is biased upwardly against the plug by a suitable compression spring 367 which bears at one end against the disc and at its opposite end, against the bottom closure 361. Thus through the spring and disc, the upper end of rod 365 is maintained in engagement with the accelerator, so as to follow accelerator movement during its actuation.

Contacts 368 and 369 are carried by and extend through diametrally opposite wall portions of the housing adjacent the plug 364, while carried by the disc 366 is a contact bridging element or bar 370, the bar being by preference, embedded in the disc as shown. The arrangement of the switch parts is such that the contacts 368—369 are bridged by bar 370 when the disc abuts the plug 364. In associating this switch with the control circuit of Fig. 21, the switch replaces switch 281 and the battery conductor 292 may be connected directly to the contact 268 and the lead 293 to the opposite contact 369.

The function of the accelerator-operated switch is similar to that of the clutch-actuated switch 281, closure of the former being effected when the accelerator pedal is released to reduce the engine fuel feed to a minimum, as is generally the practice preparatory to shifting from one transmission speed-drive to another, while closure of the latter is effected upon disengagement of the clutch, as for the same reason.

It is apparent from the described arrangement of the three wound core portions characterizing the control operating unit, that they serve, through the rotational effect on the stub shaft sections and eccentrics, essentially as an electric motor, in imparting a reversible, partial rotational movement, or torque, to the eccentrics. It is further seen that the outer winding of the operator, serves essentially as the winding of a solenoid or electromagnet structure, the armature or core of which consists of the inner wound elements which of themselves, when energized, produce the torque effect. Thus the operator constitutes, in effect, a combined electric motor and solenoid, and serves, with the motion translating elements, to provide a compound control movement available for the control-actuation of many types of apparatus. As applied to a standard three speed and reverse type of transmission, the control operator, as will have appeared, enables a reciprocal control movement in either of two spaced planes, and in a plane intersecting the two spaced planes—otherwise described in the particular example as capable of effecting control movement in an H shaped path.

From the foregoing description of the improved control assembly as applied to transmission gearshifter mechanism, together with a preferred control circuit arrangement therefor, it will appear that the present invention provides an efficient and positively functioning means for effecting a variety of control movements or a series of related control actuations, as in the speed-change control of power transmission gearing. Moreover, the apparatus comprising the electromagnetic operator is compactly arranged and of unit form, being adapted to a ready and advantageous operative association with transmission assemblies as used in prevailing types of automotive vehicles and the like.

It is to be understood of course, that since the present disclosure relates only to a preferred selected embodiment of the invention, alterations or modifications in the parts or in the operative association thereof, may be made without departing from the spirit and scope of the invention as defined by the appended claims.

I claim:

1. An electromagnetic gear-shifting device, comprising a plurality of nested and coaxially arranged electromagnetic members capable of axial displacement as a unit, one thereof being adapted for angular displacement relative to another, energizing windings functionally associated with said members, and switch means in circuit controlling relation to said windings, operation of said switch means serving to effect energization of one of said windings to cause axial displacement of said members as a unit, and to effect energization of others of said windings to cause angular displacement of said one member.

2. The subject of claim 1 wherein the switch means includes a switch operated in response to axial displacement of the electromagnetic members, for effecting energization of others of said windings to cause angular displacement of said one member.

3. An electromagnetic gear-shifting mechanism comprising a pair of concentrically related, electromagnetic members axially displaceable as a unit, one thereof being capable of rotary movement relative to the other, energizing windings functionally associated with said members, certain thereof being carried by said members, a switch in circuit-controlling relation to said windings, and a second switch in circuit controlling relation to one of said windings and operated in response to axial displacement of said members, said first switch being operable to effect energization of certain of said windings to cause axial displacement of said members as a unit, and said second switch operated in response to said displacement of the members, and serving to effect energization of said one winding to cause rotational displacement of said one of the electromagnetic members.

4. In combination with a speed-change power-transmission assembly provided with an element operable to effect speed-ratio changes, a device of electromagnetic type for actuating said element, the device comprising cooperating electromagnetic members and a frame structure common to said members, the members being arranged for linear displacement longitudinally thereof, one of said members being adapted for angular displacement relative to another, and to the frame, means operatively connecting said members to said transmission element, and exciter means functionally associated with said members, operable to effect energization of said members to cause both linear displacement of said members and angular displacement of said one member.

5. In combination with a power transmission assembly of a multi-speed-ratio type, provided with an element operable to effect speed-ratio changes in said transmission, a device of electromagnetic type for actuating said element, the device comprising coaxially related electromagnetic members adapted for axial displacement as a unit, one thereof being adapted for angular displacement relative to another, operating means connecting said members to said transmission element, a field winding associated with said members, an exciter winding carried on each of said members, control means in circuit with said field winding and operable to effect energization thereof for causing axial displacement of said members as a unit, and control means in circuit with one of said exciter windings, operable in response to axial displacement of said members to effect energization of said winding for causing angular displacement of said one member.

6. In a transmission speed-ratio control system for transmission assemblies of multi-speed-ratio type, an electromagnetically operated speed changing device comprising a pair of concentrically related electromagnet members arranged for axial displacement as a unit, solenoid windings arranged to effect such axial displacement, one of the electromagnet members being adapted for angular displacement relative to the other, energizing windings for said members, and operating circuits for said windings, including a switch adapted for facultative actuation to effect energization of certain of said windings, whereby to cause an initial axial displacement of said members and an initial angular displacement of said one member.

7. In a control device for a speed-change power transmission drive assembly, an electromagnetically operated device comprising a pair of concentrically related electromagnet members arranged for axial displacement as a unit, one thereof being adapted for angular displacement relative to the other, means operatively connecting said members to the transmission assembly in a manner to utilize said displacement movements of the members for effecting speed-ratio changes in the transmission, a winding functionally associated with said members, serving when energized to cause axial displacement of the members as a unit, windings on said members arranged to effect when energized, angular displacement of said member susceptible thereof, and control means in circuit with said windings for controlling energization thereof, said control means including a manually actuable switch, a switch operable responsively to the speed of said transmission drive assembly, and means in circuit with said switches operable for selecting either switch for controlling energization of the windings.

8. In combination with a speed-change power transmission assembly for automotive vehicles and the like, mechanism of electromagnetic type, operatively associated with the transmission assembly for effecting speed-ratio changes therein, the mechanism comprising magnetic members capable of axial displacement as a unit, one thereof being adapted for angular displacement relative to another, energizing windings functionally associated with said members, one thereof adapted to cause when energized, axial displacement of said members as a unit, others of said windings being adapted to cause when energized, angular displacement of said one member, energizing circuits for said windings, including a manually operated control switch and a vehicle operated control switch in parallel circuit relation, and a selector switch operable to connect either of said control switches to said energizing circuits, to the exclusion of the other, whereby the selected control switch is adapted to influence the energizing circuits to effect energization of said windings.

9. An electromagnetic gear-change mechanism, comprising a pair of coaxially related electromagnetic members adapted for axial displacement as a unit, one thereof being adapted for angular displacement relative to the other, a field winding structure functionally associated with said members, and including a plurality of serially connected field coils, exciter windings on said members, and energizing circuits for said coils and exciter windings including control switches, one of said switches being arranged for controlling selectively, energization of said field coils in a manner to cause axial displacement of said members as a unit, and another of said switches being arranged for controlling energization of one of said exciter windings to cause angular displacement of said one member.

10. In an electromagnetic operator for speed-change transmission assembly, an element arranged for movement into a plurality of control positions to effect changes in transmission speed ratio, an electromagnetic assembly including a motor provided with a rotor adapted for at least partial rotation, and electromagnetic means for axially displacing the motor as a unit, the motor being operatively associated with said control element, switching and circuit means adapted to permit energization of the motor and the axial displacing means, for selectively actuating said control element into its several control positions, and switching means operable responsively to a defined extent of movement of the motor and a defined extent of movement of the axial displacing means, for limiting the range of movement of said motor and means, with respect to the several control positions attainable by actuation of the control device.

11. An electromagnetic gear shifting mechanism in operative association with speed change apparatus, the mechanism including a plurality of wound elements characterized by defined axes, the elements being coaxially arranged and at least two thereof constituting a unit adapted for movement relative to a third one of said elements, in an axial direction, upon predetermined energization, at least one of the elements of said unit being adapted for energization to effect an angular displacement of the other thereof, and means for translating the movement of the elements of said unit, to speed change apparatus to be controlled by the mechanism.

12. In a gear shifting mechanism of electromagnetic type, in operative association with a speed change transmission, two windings, a core for each of the windings forming therewith a wound element, one of the elements extended within the other, the mechanism including a separate wound element adapted for electrical energization in a manner selectively to cause a translatory movement of one of the first said wound elements, one of the first said elements being adapted for energization to cause relative angular displacement of the first said elements, and means for translating said movements of the first said elements to a speed change transmission to be controlled thereby.

13. In an electromagnetic gear shifting device, a plurality of electromagnetic elements constituted by windings and cores therefor, one of said elements being capable of both translatory and rotational movements, a pivotally and axially displaceable control member in actuated relation to said one of the electromagnetic elements, and means for selectively energizing the windings, to effect in sequence, translatory and rotational movements of said one of the electromagnetic elements, whereby to cause a corresponding sequential pivotal and axial displacement movement of the control member.

14. An electromagnetic gear-shift operator in operative association with speed change apparatus, said operator including a plurality of wound elements arranged one within another, and arranged for relative translatory movement, in either of two directions upon predetermined energization, at least two of said wound elements being arranged for relative angular displacing movement, upon predetermined energization thereof, and means for transmitting said movements to speed-change apparatus to be controlled.

15. In an electromagnetic gear shifting mechanism, a frame structure, and a combined motor and electromagnet, including separate motor and magnet windings having a common armature and rotor structure disposed in said frame.

16. In an electromagnetic gear shifting mechanism adapted for operative association with a speed-change apparatus, a motor including a rotor capable of limited axial displacement, and auxiliary windings, adapted upon energization, to cause axial displacement of the rotor, and means for translating the rotary and displacement movements of the rotor, for purposes of control of the associated speed-change apparatus.

17. In an electromagnetic gear shifting device, in operative association with a speed change transmission, a solenoid assembly including at least two armature elements adapted to occupy any of a plurality of axial positions, and windings associated with the armature elements, for effecting rotation of one of said armature elements, while the armatures and means including a shiftable member actuated by said armature elements, are in any of said axial positions for connecting said armature elements to the speed change transmission for control actuation.

18. An electromagnetic gear shifting mechanism in operative association with a speed change transmission, a solenoid including windings and an armature structure, the armature structure comprising a torque-producing motor, means for selectively energizing the solenoid and the motor, and means including an operative connection between the solenoid and transmission, for translating selectively, the movements of the solenoid and the motor, for effecting control actuation of the associated speed change transmission.

19. An electromagnetic speed change or gear shifting device, the electromagnetic device including a field structure, a rotor structure adapted for partial rotation responsively to predetermined energization of said field structure, at least one of said structures being capable of limited axial displacement, and auxiliary windings cooperating with the axially displaceable structure to cause axial displacement thereof, upon predetermined energization of said auxiliary windings.

20. An electromagnetic gear shifting mechanism in operative association with a speed-change transmission, said mechanism including a frame, three coaxially arranged, wound structures associated with the frame, two of said structures being related in torque-producing relation, and the third structure related as a solenoid winding, coacting with at least one of the other structures as an armature, a slidable support for the last said wound structure, such that it is adapted for a limited linear movement and means for translating the movements resulting from the selective energization of said wound structures, to the speed-change transmission controlled by the mechanism.

21. An electromagnetic speed-change control device in combination with a speed change transmission, adapted to effect a compound movement and impart same to the speed change transmission to be controlled by the device, three coaxially arranged, wound structures, two of said structures being related in torque-producing relation, the third structure being disposed as a solenoid winding, coacting with at least one of the other structures as an armature to effect a linear movement, and means for translating to the transmission, the compound movement effected by the torque-related windings in coaction with the solenoid winding.

22. In an electromagnetic operator in combination with a speed-change transmission assembly having a control element arranged for movement into a plurality of control positions to effect changes in transmission speed ratio, an electromagnetic device including a plurality of coaxially arranged wound elements, an actuating member connected to one of said wound elements and operatively associated with the control element, switching and circuit means adapted to permit energization of selected wound elements of said device for selectively imparting to said one of said wound elements and the actuating member connected thereto, an axial and an angular movement, and thereby adapted for selectively actuating said control element into its several control positions, and switching means operable responsively to movements of the said control element, for limiting its range of movement with respect to its several control positions.

23. In an electromagnetic operator for attachment to a speed-change transmission assembly, a member arranged for movement into a plurality of control positions to effect changes in transmission speed ratio, an electromagnetic device including a plurality of wound elements disposed one within another, means operatively connecting certain of the wound elements with the control member, switching and circuit means adapted to permit energization of the selected wound elements of said device for selectively imparting to one of the wound elements, an axial and an angular movement, whereby the device is adapted through said connecting means, for selectively actuating said control member into its several control positions, and switching means operable responsively to movement of said control member, for controlling the operation of said device to limit the range of movement of said control member with respect to its several control positions.

EUGENE S. BUSH.